Patented June 12, 1923.

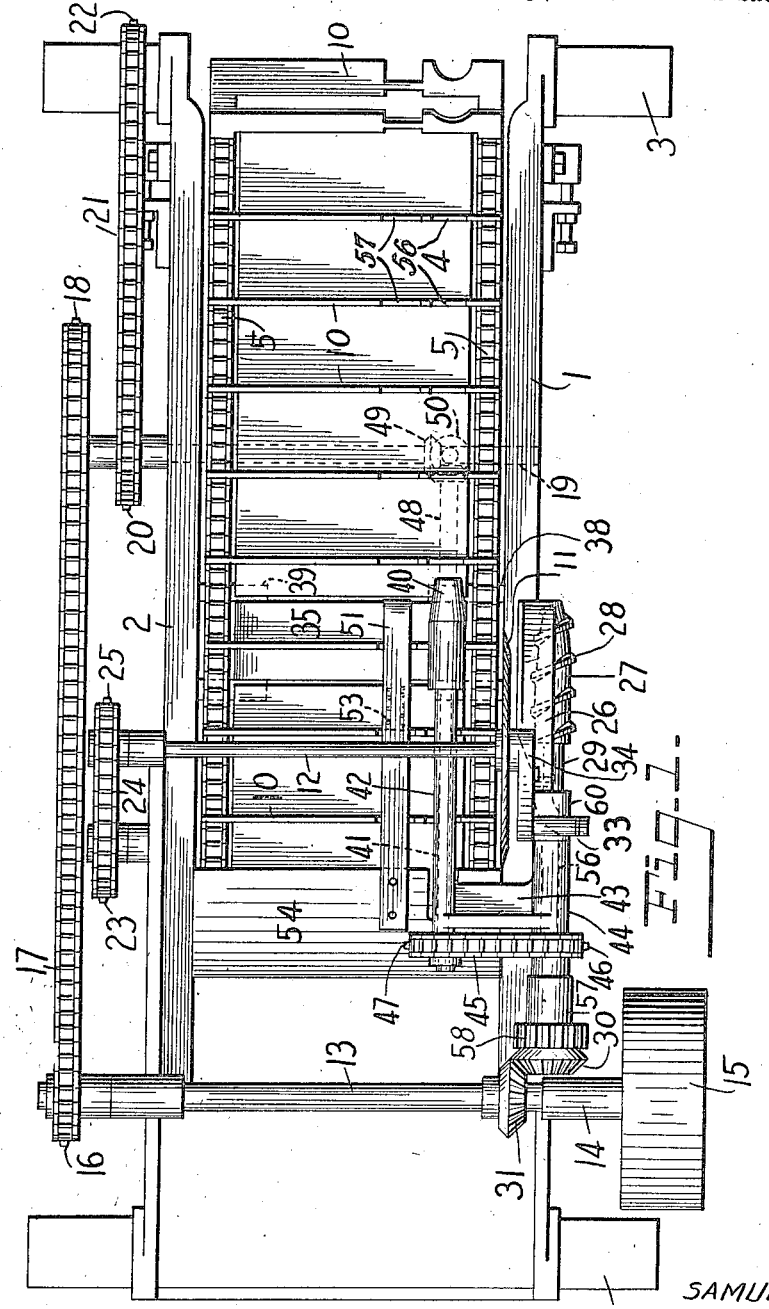

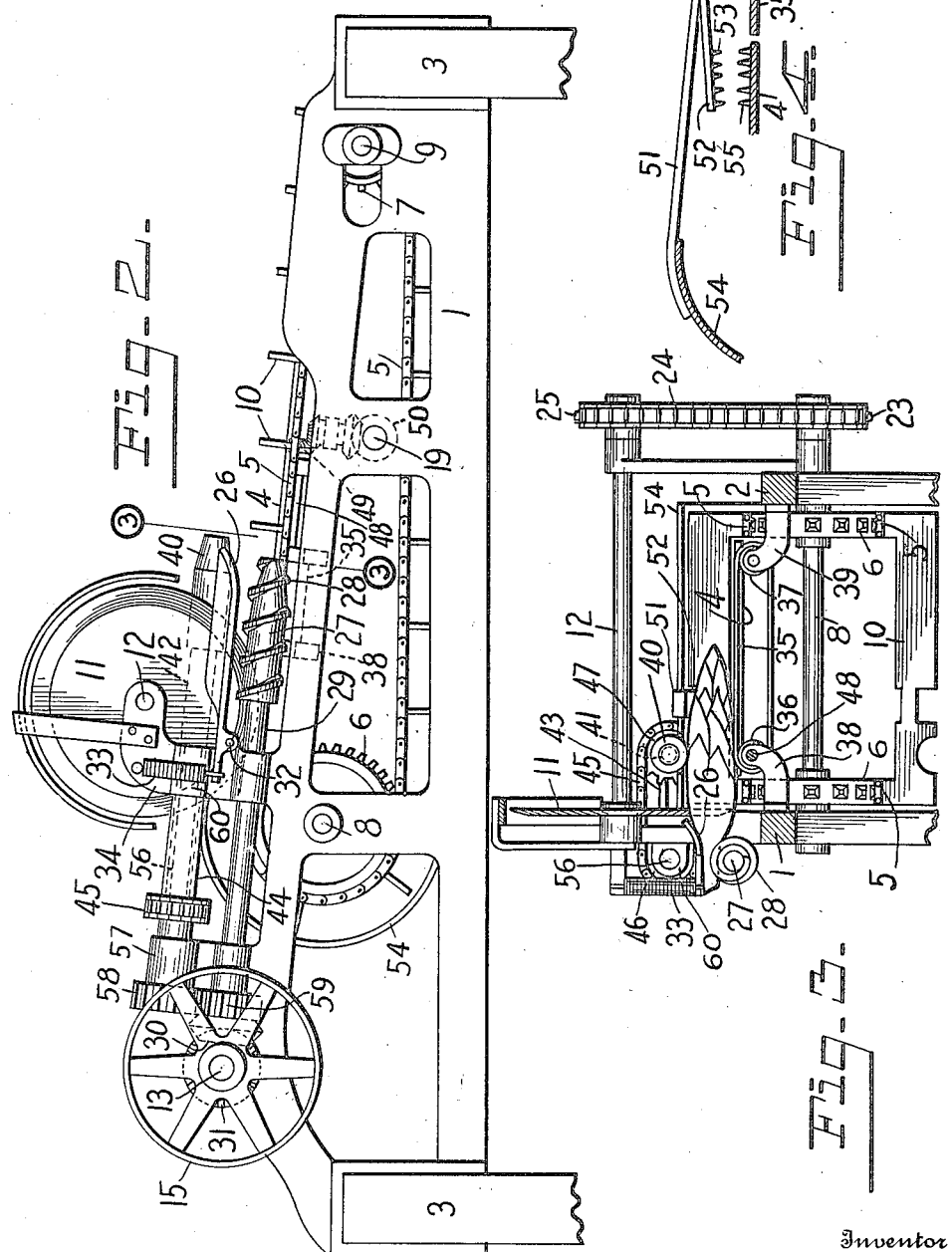

1,458,142

UNITED STATES PATENT OFFICE.

SAMUEL E. MORRAL AND WILLIAM W. MORRAL, OF MORRAL, OHIO.

BUTT-REMOVING DEVICE.

Application filed June 16, 1922. Serial No. 568,712.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Butt-Removing Devices, of which the following is a specification, reference being had therein to the accompanying drawing.

This invention relates to a device for removing the butts from ears of corn.

In husking green corn it is customary to sever the butts of the ears, and thereby loosening the husks, before delivering the ears to the husking devices. One very satisfactory machine which has been used for this purpose consists of a conveyor which moves the ears individually toward a cutting device and into engagement with a pair of rollers which move the ear transversely relatively to the conveyor and into engagement with a pair of gaging rollers having spiral ribs and serving to position the ear with relation to the cutter and to advance the butt end of the ear during the cutting operation. This machine, however, has certain objectionable features which it is the purpose of the present invention to overcome.

One of the objectionable features is the tendency of the butt of the ear at times to wedge between the gaging rollers, thereby causing increased resistance to the rotation of the rollers and requiring an excessive amount of power for their operation, and which also tends to draw the ear too far past the cutter, thus causing too large a portion of the ear to be severed. One object of the invention is, therefore, to provide a gaging device which will eliminate the tendency of the butt of the ear to wedge in the gaging device and which will accurately position the ear with relation to the cutter.

In the machine above mentioned, the rollers which move the ear transversely toward the gaging device are necessarily arranged close to the cutter and if the ear is positioned at the far side of the conveyor it may be moved past the rollers without coming in contact therewith and will thus be delivered to the husking devices without having the butt removed.

A further object of the invention is to provide means which will move the ear transversely to the conveyor into engagement with the gaging device regardless of the original position of the ear with relation to the conveyor.

Other objects of the invention may appear as the mechanism is described in detail.

In the accompanying drawings Fig. 1 is a top plan view of a machine embodying the invention; Fig. 2 is a side elevation of the same; Fig. 3 is a section taken on the line 3—3 of Fig. 2; and Fig. 4 is a detail view of a husk loosening device.

In these drawings we have illustrated one embodiment of the invention and have shown the same as applied to a butt removing machine, the main features of construction of which are well known, but it will be understood that the invention may be applied to machines of various kinds and may take various forms without departing from the spirit thereof.

As here shown the machine as a whole comprises a main frame consisting of side members 1 and 2 mounted upon standards 3. Mounted on the frame members 1 and 2 is a supporting structure or table 4 to which the ears of corn may be delivered by hand or any other suitable manner. Cooperating with this table is a conveyor which serves to move the ears one at a time over the surface of the table. As here shown, this conveyor consists of two endless chains 5 arranged at the respective sides of the table and mounted on sprocket wheels 6 and 7 carried respectively by shafts 8 and 9 journaled in suitable bearings on the main frame. The upper stretches of the two chains preferably lie a short distance below the upper surface of the table 4 and these chains have mounted thereon cleats, or transverse bars, 10 which travel over the surface of the table and serve to move the ears along the same. Mounted at the upper, or left hand, end of the table is a butt removing device, here shown in the form of a rotary cutter 11 carried by a shaft 12 journaled in suitable bearings on the main frame. The cutter is arranged adjacent to one edge of the table and is adapted to engage the ends of the ears and sever the butts therefrom.

The conveyor and the cutter may be operated in any suitable manner, but in the present machine a main driving shaft 13 is journaled in suitable bearings 14 on the main frame of the machine and is provided with means for connecting the same with a source of power. In the present instance, it has secured to one end thereof a belt pulley 15. Mounted on the opposite end of the shaft 13 is a sprocket wheel 16 which is connected by a sprocket chain 17 with a sprocket wheel 18 mounted on a counter shaft 19 extending transversely of the main frame and arranged between the upper and lower stretches of the conveyor chains 5. Mounted on this shaft 19 is a sprocket wheel 20 which is connected by a sprocket chain 21 with a sprocket wheel 22 on the shaft 9 which carries the sprocket wheels 7 for the lower ends of the conveyor chains, and thus serves to operate the conveyor. The cutter shaft 12, is, in the present instance, driven from the shaft 8 which carries the sprocket wheels 6 for the conveyor chain and to this end that shaft has mounted thereon a sprocket wheel 23 which is connected by a sprocket chain 24 with a sprocket wheel 25 on the shaft 12.

Mounted on the main frame on the outer side of the rotary cutter 11 is the gaging device which is of such a character as to properly position the ear with relation to the counter and to advance the butt end of the ear during the cutting operating to prevent the ear from turning and thus binding the cutter. As here shown, this gaging device comprises upper and lower members, one of which serves primarily to engage the butt of the ear and position the same with relation to the cutter and the other of which cooperates with the first mentioned member to advance the butt of the ear. If desired, the first mentioned member may be arranged closer to the cutter 11 than is the other member so that the respective members will operatively engage the butt at different distances from the point at which the butt is to be severed from the ear, although this is not essential to the operation of the device. Preferably the upper member is in the form of a bar 26 extending substantially parallel with the conveyor and along side of the cutter and having, in the present instance, its lower face curved to conform substantially with the shape of the butt of the ear. This member, or bar, is fixed against lateral movement and when engaged by the butt of the ear will check the transverse movement of the same and accurately position the ear with relation to the cutter. The lower member is here shown in the form of a roller 27 having spiral ribs 28 of sufficient depth to receive the stem, or the small end of the butt, of the ear and advance the same during the cutting operation, the stem being held in engagement with the spiral roller by the upper member or bar 26. The action of the roller 27 on the ear will hold the same in firm contact with the bar 26 but it will not exert sufficient force on the ear to cause it to wedge or bind between the two members of the gaging device. The spiral roller is here shown as mounted on a shaft 29 journaled in suitable bearings on the frame member 1 and connected by beveled gears 30 and 31 with the main driving shaft 13, whereby the spiral roller is actuated in timed relation to the movement of the conveyor and the ear held at right angles to the cutter during the butt removing operation. It is also desirable that the gaging bar 26 should be yieldable vertically to accommodate it to ears of different sizes and to accomplish this the bar may be pivotally mounted on the frame, as shown at 32 and may be acted upon in any suitable manner by a spring which will hold the same normally in its lowermost position, but will permit it to rise if engaged by a large ear. For this purpose the rear end of the bar is, in the present construction, extended beyond its axis and is acted upon by a coiled spring 33, one end of which is connected with the rear end of the gaging bar and the other end of which is connected with a bracket 34 which carries the bearing for the cutter shaft 12.

The means for moving the ear transversely to the main conveyor and into engagement with the gaging device may take various forms but in order that it may act on the ear regardless of the position of the latter on the conveyor it is here shown as comprising a transverse conveyor, the upper surface of which lies in substantially the plane of the upper surface of the table 4, the latter being cut away to provide an opening in which the conveyor is mounted. In the present instance this conveyor is in the form of a belt 35 supported at its ends on rollers 36 and 37 journaled in brackets 38 and 39 carried by the main frame. The belt extends for substantially the full width of the table 4 and will, therefore, engage any ear that is advanced by the main conveyor. To more positively move the ear into engagement with the gaging device, a roller 40 is arranged to cooperate with the transverse conveyor. This roller is arranged in the present machine directly above the roller 36 which carries one end of the belt and when the ear has been moved transversely far enough to engage the upper roller it will be gripped between the two rollers and moved into engagement with the gaging devices. The roller 40 has a yielding movement to permit it to accommodate itself to ears of different sizes, and, as here shown, is carried by a shaft 41 journaled in a bearing 42 on an arm 43 having a second bearing 44 by means of which it is journaled on a shaft 56 arranged above the shaft 29 and driven therefrom by gears 58 and 59. The roller 40 is driven from the shaft 56 by means of a sprocket chain 45 which passes about sprocket wheels 46 and 47 on the shafts 56 and 41 respectively. The transverse conveyor, or belt, 35 is driven from the counter shaft 19 and to this end the shaft 48 of the roller 36 which carries one end of the belt extends forwardly and is connected by beveled gears 49 and 50 with the shaft 19.

The machine is also provided with a device for loosening the husks on the ear and as here shown this device is in the form of a resilient bar 51 of relatively stiff character, mounted at its rear end on a fixed part of the machine and having at its forward end a downwardly and rearwardly inclined portion 52 provided with teeth 53 and arranged alongside of the roller 40 in a position to engage the upper sides of the ears of corn as they are fed forward by the main conveyor and thus tear the same and loosen the husks in such a manner as to facilitate their removal by the husking device. If desired the table 4 may be provided with teeth 55 arranged in the rear of the transverse conveyor 35 and beneath the toothed portion 52 of the bar 51, to cooperate with the toothed portion of the bar to more effectively loosen the husks. Preferably the transverse bars 10 of the conveyor are provided with recesses or ways, 56 and 57, arranged in line with the roller 40 and the bar 51, respectively, to enable the conveyor bars to clear those parts, which are placed close to the supporting structure so that they will operate on ears of small size.

While we have shown and described one embodiment of our invention we wish it to be understood that we do not desire to be limited to the details thereof as various modifications may occur to a person skilled in the art.

Having now fully described our invention what we claim as new and desire to secure by Letters Patent is:

1. In a machine of the character described, a butt removing device, a conveyor to move an ear of corn toward said butt removing device, means to move said ear of corn transversely to said conveyor, a gaging bar to engage the butt end of the ear and position the same with relation to said butt removing device, and a spiral roller to engage the butt end of the ear and advance the same during the butt removing operation.

2. In a machine of the character described, a butt removing device, a conveyor to move an ear of corn toward said butt removing device, means to move said ear of corn transversely to said conveyor, a gaging bar to engage the butt end of the ear and position the same with relation to said butt removing device, said bar being yieldable to accommodate it to ears of different sizes, and a spiral roller to engage the butt end of the ear and advance the same during the butt removing operation.

3. In a machine of the character described, a butt removing device, a conveyor to move an ear of corn toward said butt removing device, means to move said ear of corn transversely to said conveyor, a gaging bar to engage the butt end of the ear and position the same with relation to said butt removing device, and a spiral roller to engage the butt end of the ear and advance the same during the butt removing operation, said roller being spaced a greater distance from the butt removing device than is said bar.

4. In a machine of the character described, a butt removing device, a conveyor to move an ear of corn toward said butt removing device, means to move said ear of corn transversely to said conveyor, and an ear gaging device comprising an upper member to engage the butt end of the ear and limit its transverse movement and a lower member arranged to engage said butt end of the ear at a point further removed from the cutter than is the point at which the butt end of the ear is engaged by the upper member, and adapted to advance said butt end of the ear during the butt removing operation.

5. In a machine of the character described, a butt removing device, a conveyor to move an ear of corn toward said butt removing device, means to move said ear of corn transversely to said conveyor, and a gaging device comprising upper and lower members arranged in different vertical planes to engage the butt end of the ear to position it with relation to the butt removing device, and to advance the same during the butt removing operation.

6. In a machine of the character described, a butt removing device, a conveyor, to move an ear of corn toward said butt removing device, means to move said ear of corn transversely to said conveyor, and a gaging device comprising upper and lower members arranged in different vertical planes, one of said members serving as a stop to limit the transverse movement of the ear and the other member having means to advance the butt of the ear during the butt removing operation.

7. In a machine of the character described, a butt removing device, a conveyor to move an ear of corn toward said butt removing device, means for moving said ear of corn transversely to said conveyor, and a gaging device having butt engaging parts arranged to operatively engage the butt at different distances from the point at which the butt is to be severed from the ear and having means to advance the butt while it is in engagement therewith.

8. In a machine of the character described, a butt removing device, a conveyor to move an ear of corn toward said butt removing device, means to move said ear of corn transversely to said conveyor, and a gaging device comprising upper and lower members arranged in different vertical planes to engage the butt end of the ear to position it with relation to the butt removing device, and to advance the same during the butt removing operation, one of said members being yieldable in a vertical plane.

9. In a mechanism of the character described, a butt removing device, a conveyor to move an ear of corn toward said butt removing device, means to move said ear of corn transversely to said conveyor, a gaging bar arranged alongside of said butt removing device and pivotally supported at one end, a spring acting on said bar to resist its movement about said pivot, and a spiral roller to engage the butt end of the ear and advance the same during the butt removing operation.

10. In a mechanism of the character described, a butt removing device, a conveyor to move an ear of corn toward said butt removing device, means to move said ear of corn transversely to said conveyor, a gaging bar arranged alongside of said butt removing device and pivotally supported at one end, a spring acting on said bar to resist its movement about said pivot, and a spiral roller to engage the butt end of the ear and advance the same during the butt removing operation, said roller being spaced a greater distance from the butt removing device than is said bar.

11. In a machine of the character described, a butt removing device, a conveyor to move an ear of corn toward said butt removing device, a second conveyor extending for substantially the full width of the first mentioned conveyor to move said ear of corn transversely thereto, and a gaging device to position the butt end of said ear with relation to said butt removing device and having means to advance the same during the butt removing operation.

12. In a machine of the character described, a butt removing device, a conveyor to move an ear of corn toward said butt removing device, a roller to engage said ear of corn and move the same transversely to said conveyor, a second conveyor extending transversely to the first mentioned conveyor to move the ear of corn into engagement with said roller, and a gaging device to position the butt end of said ear with relation to said butt removing device and having means to advance the same during the butt removing operation.

13. In a machine of the character described, a butt removing device, a conveyor to move an ear of corn toward said butt removing device, a second conveyor extending for substantially the full width of the first mentioned conveyor to move said ear of corn transversely thereto, a gaging device to position the butt end of said ear of corn with relation to said butt removing device and to advance the same during the butt removing operation, and a roller cooperating with said second conveyor to move the ear of corn into engagement with said gaging device.

14. In a machine of the character described, a butt removing device, a conveyor to move an ear of corn toward said butt removing device, a pair of rollers arranged one above the other to engage the ear of corn and move it transversely relatively to said conveyor, a belt extending transversely to said conveyor to engage the ear of corn and move the same into operative relation with said rollers, and a gaging device to position the butt end of said ear with relation to said butt removing device and to advance the same during the butt removing operation.

15. In a machine of the character described, a butt removing device, a conveyor to move an ear of corn toward said butt removing device, a pair of rollers arranged one above the other to engage the ear of corn and move it transversely relatively to said conveyor, a belt extending about the lowermost of said rollers and extending transversely to said conveyor to move the ear of corn into operative relation to said rollers, and gaging devices to position the butt end of said ear with relation to said butt removing device and to advance the same during the butt removing operation.

16. In a machine of the character described, a butt removing device, a conveyor to move an ear of corn toward said butt removing device, a second conveyor extending transversely to the first mentioned conveyor to move said ear of corn transversely thereof, a gaging bar to engage the butt end of the ear of corn and position the same with relation to said butt removing device, and a spiral roller to engage the butt end of said ear and advance the same during the butt removing operation.

17. In a machine of the character described, a butt removing device, a conveyor to move an ear of corn toward said butt removing device, a second conveyor extending transversely to the first mentioned conveyor to move said ear of corn transversely thereof, a gaging bar to engage the butt end of the ear of corn and position the same with relation to said cutter, and a spiral roller to engage the butt end of said ear and advance the same during the butt removing operation, said spiral roller being spaced a greater distance from the cutter than is said bar.

18. In a machine of the character described, an ear supporting table having a transverse opening, a butt removing device at one side of said table, a conveyor comprising transverse bars arranged to travel over said table and move an ear of corn lengthwise thereof, a second conveyor arranged in the opening in said table to move said ear of corn transversely to said table and toward said butt removing device, a gaging device to position said ear with relation to said butt removing device, and a husk loosening device arranged above said table and beyond the opening therein to engage said ear of corn and loosen the husks thereon.

19. In a machine of the character described, a butt removing device, a conveyor to move an ear of corn toward said butt removing device, a gaging device to position said ear of corn with relation to said butt removing device, means to move said ear transversely to said conveyor and toward said gaging device, and a husk loosening device arranged above the said conveyor and comprising a yieldable member having a toothed portion arranged to engage the ear after it has been acted upon by said butt removing device.

20. In a machine of the character described, a butt removing device, a conveyor to move an ear of corn toward said butt removing device, a gaging device to position an ear of corn with relation to said butt removing device, a second conveyor extending transversely to the first mentioned conveyor to move said ear of corn toward said gaging device, a husk loosening device arranged above the first mentioned conveyor and comprising a yieldable bar having a toothed portion to engage the ear, and a toothed member arranged beneath the toothed portion of said bar and cooperating therewith.

21. In a machine of the character described, a butt removing device, a conveyor to move an ear of corn toward said butt removing device, means to move said ear of corn transversely to said conveyor, and a gaging device comprising two members arranged substantially parallel with said conveyor and spaced apart, one of said members having a smooth surface along which the butt of the ear may move and the other of said members having means to move the butt of the ear along said other member.

22. In a machine of the character described, a butt removing device, a conveyor to move an ear of corn toward said butt removing device, means to move said ear of corn transversely to said conveyor, and a gaging device comprising two members arranged substantially parallel with said conveyor and spaced apart, one of said members having a smooth surface along which the butt of the ear may move and the other of said members being mounted for rotary movement and having spiral ribs to engage the butt of the ear and advance the same along the first mentioned member.

23. In a machine of the character described, an ear supporting structure, a butt removing device arranged adjacent to said supporting structure, a conveyor comprising endless belts arranged at the respective edges of the supporting structure, and transverse bars connecting said belts and traveling over said supporting structure to move an ear of corn crosswise of its length to the butt removing device, a gaging device arranged adjacent to said supporting structure to position the butt end of the ear with relation to the said butt removing device, and a roller to engage said ear of corn and move the same transversely to said conveyor into engagement with said gaging device, the transverse bars of said conveyor having recesses to receive said roller and permit said bars to pass the same.

24. In a machine of the character described, an ear supporting structure, a butt removing device arranged adjacent to said supporting structure, a conveyor comprising endless belts arranged at the respective edges of the supporting structure, and transverse bars connecting said belts and traveling over said supporting structure to move an ear of corn crosswise of its length to the butt removing device, a gaging device arranged adjacent to said supporting structure to position the butt end of the ear with relation to the said butt removing device and having means to advance the butt of the ear during the butt removing operation, and a roller to engage said ear of corn and move the same transversely to said conveyor into engagement with said gaging device, the transverse bars of said conveyor having recesses to receive said roller and permit said bars to pass the same.

25. In a machine of the character described, an ear supporting structure, a butt removing device arranged adjacent to said supporting structure, a conveyor comprising endless belts arranged at the respective edges of the supporting structure, and transverse bars connecting said belts and traveling over said supporting structure to move an ear of corn crosswise of its length to the butt removing device, a gaging device arranged adjacent to said supporting structure to position the butt end of the ear with relation to the said butt removing device, a belt having its upper stretch arranged adjacent to the surface of said supporting structure and moving transversely thereto, and a roller arranged above said belt and cooperating therewith to move the butt end of said ear of corn into engagement with said gaging device, the transverse bars of said conveyor having recesses in the outer edges thereof to receive said roller and permit said bars to pass the same.

In testimony whereof, we affix our signatures hereto.

SAMUEL E. MORRAL.
WILLIAM W. MORRAL.